US009857570B1

(12) United States Patent
Durazo et al.

(10) Patent No.: US 9,857,570 B1
(45) Date of Patent: Jan. 2, 2018

(54) FULL FLAT MIRROR GUIDING REFLECTIONS TO APERTURE OF PANORAMIC OPTICAL DEVICE

(71) Applicant: VSN TECHNOLOGIES, INC., Fort Lauderdale, FL (US)

(72) Inventors: Patricio Durazo, Tucson, AZ (US); Gary Peterson, Center City, MN (US); William H. Robertson, Jr., Fort Lauderdale, FL (US); John N. Shemelynce, Fort Lauderdale, FL (US); Amit Verma, Sunrise, FL (US)

(73) Assignee: HOYOS INTEGRITY CORPORATION, San Juan, PR (US)

( * ) Notice: Subject to any disclaimer, the term of this patent is extended or adjusted under 35 U.S.C. 154(b) by 200 days.

(21) Appl. No.: 14/340,386

(22) Filed: Jul. 24, 2014

(51) Int. Cl.
*G02B 13/06* (2006.01)
*G02B 17/08* (2006.01)
*H04N 5/232* (2006.01)
*G02B 5/22* (2006.01)

(52) U.S. Cl.
CPC ............ *G02B 13/06* (2013.01); *G02B 17/08* (2013.01); *H04N 5/23238* (2013.01); *G02B 5/22* (2013.01)

(58) Field of Classification Search
CPC .......... G02B 13/06; G02B 17/08; G02B 5/22; H04N 5/23238
See application file for complete search history.

(56) References Cited

U.S. PATENT DOCUMENTS

| 3,240,113 | A | * | 3/1966 | Stechemesser | G03B 37/00 353/99 |
| 5,627,675 | A |   | 5/1997 | Davis et al. | |
| 5,854,713 | A | * | 12/1998 | Kuroda | G02B 13/06 250/234 |
| 6,130,783 | A |   | 10/2000 | Yagi et al. | |
| 6,313,865 | B1 |   | 11/2001 | Driscoll et al. | |
| 6,333,826 | B1 |   | 12/2001 | Charles | |
| 6,449,103 | B1 |   | 9/2002 | Charles | |
| 6,611,282 | B1 |   | 8/2003 | Trubko et al. | |
| 2002/0098461 | A1 | * | 7/2002 | Cardarelli | A61B 1/247 433/30 |
| 2004/0252384 | A1 | * | 12/2004 | Wallerstein | G02B 13/06 359/725 |
| 2004/0264013 | A1 |   | 12/2004 | Matsuki et al. | |
| 2010/0079741 | A1 | * | 4/2010 | Kraehmer | G03F 7/70308 355/71 |
| 2015/0256655 | A1 | * | 9/2015 | Jannard | H04M 1/0202 455/575.8 |

* cited by examiner

*Primary Examiner* — Jamie Atala
*Assistant Examiner* — Hesham Abouzahra
(74) *Attorney, Agent, or Firm* — Patents on Demand P.A.; Brian K. Buchheit

(57) ABSTRACT

A reflector can have a conical shape. The shape can tapers from a wide base to an apex. The apex can include an aperture, a mirror, and a set of one or more optical elements. A mirror is location in a cavity and is positioned within an overhang enclosure of the device in a plane approximately parallel to a circular cross section of the conical shape. The mirror can reflect environmental light that is reflected by the reflector into the aperture or reflect light emitting from the aperture onto the reflector. Stray light reflected by the mirror is absorbed by the cavity walls. A set of one or more optical elements can be positioned at least partially within a volumetric region of the reflector. The one or more optical elements focus light passing through the aperture to an image sensor.

18 Claims, 6 Drawing Sheets

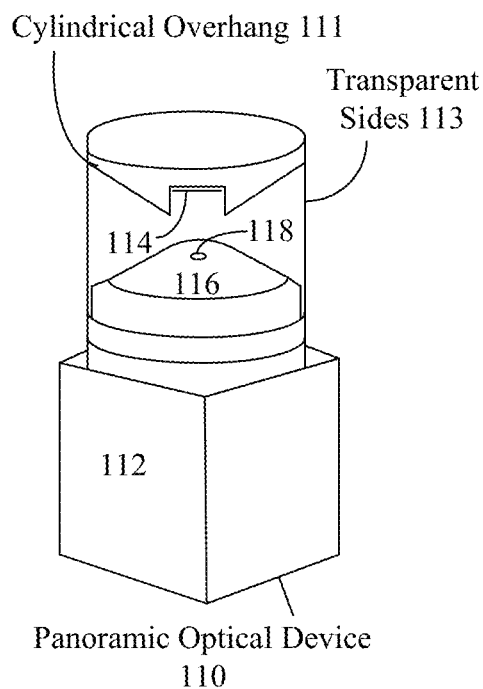
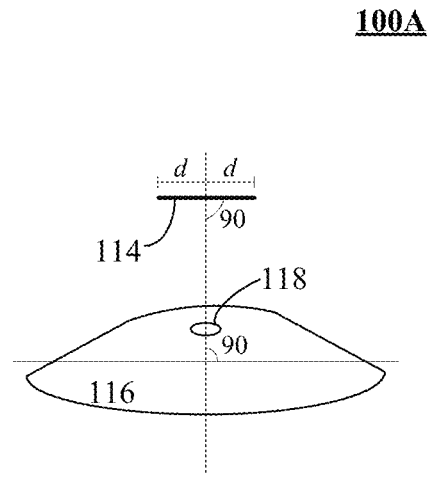
FIG. 1A
FIG. 1B
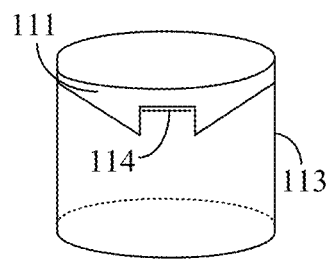
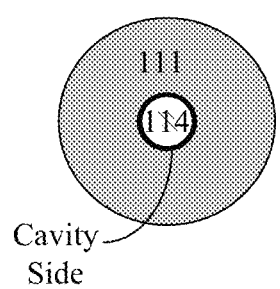
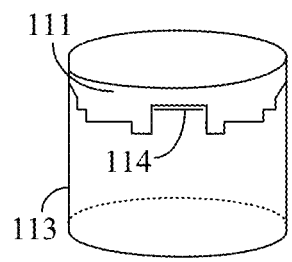
FIG. 1C   FIG. 1D   FIG. 1E
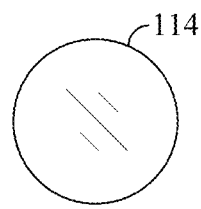
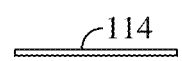
FIG. 1F   FIG. 1G

Optimum Light Path

Absorb Non-Centered
Reflections at Cavity Side

Light Blocked (e.g., overhang
too low)

Light Not Reflected,
Concavity too Deep

Secondary Reflections,
Concavity Too Shallow

Secondary Reflections,
Concavity Too Shallow

Embodiment 510

Embodiment 540

US 9,857,570 B1

FULL FLAT MIRROR GUIDING REFLECTIONS TO APERTURE OF PANORAMIC OPTICAL DEVICE

BACKGROUND

The present invention relates to the field of a single-shot panoramic optical device and, more particularly, to a full flat mirror guiding reflections to an aperture of a panoramic optical device.

Providing high quality optics in a panoramic camera is challenging. Different approaches have been taken for this problem. One approach is to move a lens and to capture a set of images as the lens moves, which cover a field of view over time. The images from the moved lens are combined to form panoramic scene. Another approach is to form an array of multiple different camera lenses and to combine the image results captured by the array of lenses into a single image. Still another is to utilize an ultra-wide angle lens (e.g., a fish-eye lens) to capture a scene with a wider-than-normal field of view. Yet another is to use a panoramic optical device to create a 360 degree horizontal field of view using a single shot (a discrete point of time using a single lens). This later approach is sometimes referred to as a "one-shot" panoramic device, which captures a panoramic scene in a single point in time using a single lens. Each of these approaches has benefits and drawbacks depending on use cases.

Within one-shot solutions that use panoramic optical components, a number of approaches have been taken depending on situation. Frequently, these components permit a single 360 degree image of an environment to be captured. Traditional panoramic one shot cameras place an inverted curved reflective surface in front of an image sensor, to reflect light before directing it to an image sensor. These approaches result in a cumbersome physical configurations and product distorted 360 degree images lacking high fidelity.

BRIEF SUMMARY

One aspect of the present invention describes a one shot panoramic camera that is a device with a quadric reflector, a mirror, and a set of optical elements. The quadric reflector has a conical shape, which tapers from a wide base to an apex. The apex comprising an aperture. The mirror is located in a cavity of an overhang enclosure of the device. The mirror is positioned in a plane approximately parallel to a circular cross section of the quadric reflector. A center of the non-refractive mirror is substantially centered above the aperture. Walls of the cavity within which the mirror is located comprise a light absorbing material which absorbs stray light. Stray light is light reflected from the quadric reflector and mirror that is not directed for conveyance through the aperture upon being initially reflected by the mirror. Absorption of the stray light by the walls of the cavity minimizes light being double reflected off the mirror through the aperture. The optical elements are positioned at least partially within a volumetric region of the quadric reflector. The optical elements focusing light passing through the aperture. In other words, the non-reflective surface works to minimize the conveyance of undesirable reflections to the aperture.

Another aspect of the present invention describes a one-shot panoramic camera optical component. The component includes a mirror recessed in a cavity of an overhang of a panoramic optical camera device. The mirror is positioned in a plane approximately parallel to a circular cross section of a quadric reflector of the panoramic optical camera device. A center of the non-refractive mirror is substantially centered above an aperture of the quadric reflector. Walls of the cavity within which the mirror is recessed comprise a light absorbing material which absorbs stray light. Stray light is light reflected from the quadric reflector and mirror that is not directed for conveyance through the aperture upon being initially reflected by the mirror. Absorption of the stray light by the walls of the cavity minimizes light being double reflected off the mirror through the aperture. The component also comprises a transparent outer casing with a circular cross section. A topmost portion of the overhang enclosure is secured to a topmost portion of the transparent outer casing. A bottommost portion of the transparent outer casing is securable to a structure that supports the quadric reflector. An interior volume of the transparent outer casing when secured to the structure includes the quadric reflector, and the mirror.

BRIEF DESCRIPTION OF THE SEVERAL VIEWS OF THE DRAWINGS

FIG. 1A shows a panoramic optical device in accordance with embodiments of the disclosure.

FIG. 1B shows angles and position of a quadric reflector and a full flat mirror of a panoramic optical device in accordance with embodiments of the disclosure.

FIG. 1C shows a topmost portion of a panoramic optical device in accordance with embodiments of the disclosure.

FIG. 1D shows a view of a topmost portion of a panoramic optical device in accordance with embodiments of the disclosure.

FIG. 1E shows a topmost portion of a panoramic optical device in accordance with embodiments of the disclosure.

FIGS. 1F and G shows a full flat mirror in accordance with embodiments of the disclosure

DETAILED DESCRIPTION

Figure 1H:
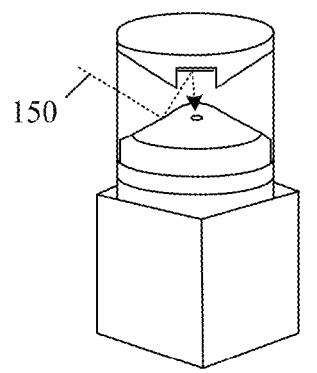
FIGS. 1H, 1I, 1J, 1K, 1L, and 1M shows light reflections for a panoramic optical device in accordance with embodiments of the disclosure.

The present disclosure is a solution for utilizing a full flat mirror to guide reflections off a quadric surface (e.g., a parabolic, hyperbolic, or elliptical reflective surface) through an aperture in the apex of the quadric surface. The full flat mirror is positioned parallel to a circular cross section of the quadric surface. The full flat mirror is positioned within a cavity. In one embodiment, the full flat mirror has substantially circular shape, as does the cavity within which the full flat mirror is recessed. Walls of the cavity may be black or coated with any light absorptive material to absorb stray light. Absorption of the stray light ensures that secondary reflections (which reflect off the full flat mirror two or more times) are not received by a sensor on an opposite side of the aperture. The full flat mirror can be a highly polished, substantially planar, reflective surface (e.g., a highly polished stainless steel surface in one embodiment). The full flat mirror may lack a glass surface to minimize refraction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be appreciated that the disclosure addresses a novel limitation associated with panoramic optical cameras. The limitation can include image banding which can occur when an environment includes objects such as mirrors and windows which can reflect additional light to optical components. In these instances, software correction cannot be utilized and a new approach is required to improve image capture. The new approach is embodied within overhang enclosure (e.g., and related components) of the panoramic optical device disclosed herein.

FIG. 1A shows a panoramic optical device having a cylindrical overhang 111 and a base 112 in accordance with an embodiment of the disclosure. The overhang is supported by transparent sides 113 through which environmental light passes. This light reflects off a quadric surface 116 to a full flat mirror 114. The full flat mirror 114 reflects light through an aperture of the quadric surface 116. An opposing side of the aperture includes an optic sensor, which converts the light reflected from the quadric surface 116 and the full flat mirror 114 into electronic information.

As shown in FIG. 1B, the full flat mirror 114 is centered above the aperture 118 and is substantially parallel to a circular cross section of the quadric reflector 116. This permits light to be captured and reflected in a substantially uniform manner about a three hundred and sixty degree arc about the panoramic optical device 110. Stated different, regardless of the rotational perspective at which the reflector 116 and mirror 114 relationship is viewed, a substantially equivalent distance (e.g., represented as d in the FIG. 1B) exist on other side of the full flat mirror's 114 center, which is also centered on the center of the aperture 118. Additionally, from a center line through the center of the quadric reflector 116 and the full flat mirror's center, a substantially ninety degree angle exists from this center line to the full flat mirror's planar surface and a substantially ninety degree angle exists from this center line to a planar cross section of the quadric reflector. Substantially in context of FIG. 1B (with regard to the 90 degree angle and the center distance "d") refers to within common manufacturing tolerances. These tolerances can vary based on the use, such as requiring a very precise +/−0.001 percent, within more flexible tolerances on less precise implementations, such as within +/−1 percent, or anywhere in between.

Figure 1I:
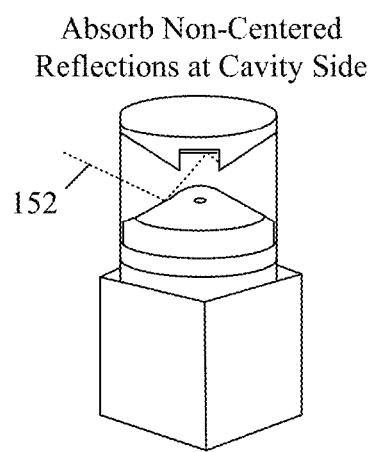

FIG. 1H shows an optimal light path given the angles of the quadric reflector and the mirror position for an illustrated embodiment. Light 150 (within a vertical arc defined for the device) is to travel substantially unimpeded to the quadric reflector 116 off the mirror 114 and through the aperture. At the same time, as shown in FIG. 1I, off-center light 152, which will not pass through the aperture 118 after being reflected by the full flat mirror 114 is stray light. The full flat mirror 114 is positioned within a cavity having a light absorbing interior wall. Thus, the stray light is absorbed, as shown by FIG. 1I.

This stray light absorption using the side walls of the cavity within which the full flat mirror is positioned is an important optical feature, which prevents multiple reflections between the quadric reflector 116 and the full flat mirror 114 (or the reflector 116, mirror, interior side of a the transparent enclosure) from being reflected through the aperture 118. Ideality, the only light passing through the reflector for processing by the image sensor has been reflected off the full flat mirror 114 once and once only. A "double" "triple" or greater reflection will result in optical noise. The desired depth and size of the cavity within which the full flat mirror 114 sits is dependent on optical properties of the entire system. The walls of the cavity can be designed to absorb at least eighty percent of the stray light in one embodiment. In another embodiment, the walls can be designed to absorb ninety percent of the stray light off the mirror 114.

Figure 1J:
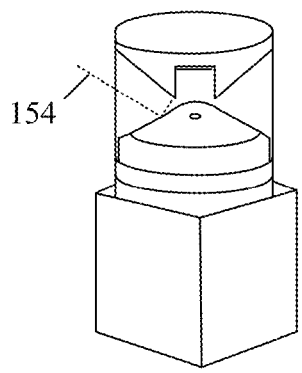

FIG. 1J illustrates an overhang that is too low, since it blocks an optical path of light 154 that would otherwise be properly reflected (once) from the full flat mirror through the aperture 118. The overhang size depends on a defined vertical angle of capture, for which the optical device is designed. For example, if the device captures images between one hundred and thirty degrees and negative fifteen degrees vertically, the pathways for these angles must be unblocked by the overhang.

Figure 1K:
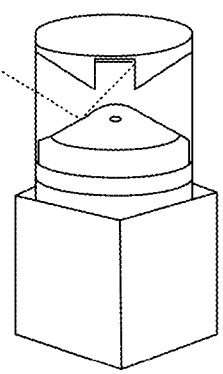
Figure 1L:
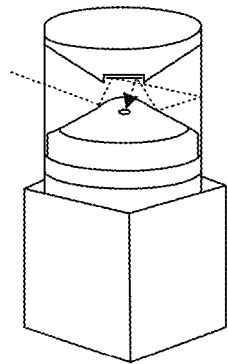
Figure 1M:
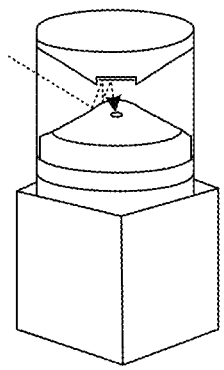

FIG. 1K illustrates a problem existing when the cavity within which the full flat mirror is positioned is too deep. Desired light (that should be reflected from the full flat mirror through the aperture is absorbed by a side wall. FIG. 1L shows a problem that exists when the cavity is not deep enough. In this situation, stray reflections are not absorbed by an interior side-wall of a cavity within which the full flat mirror is recessed. As a result, light bounces off a side wall of the transparent side, off the quadric reflector, off the full flat mirror, and through the aperture. This light (as illustrate) is not desired and has reflected off the full flat mirror twice before entering the aperture. FIG. 1M shows a situation where the cavity is too shallow, where multiple reflections exist between the quadric reflector and the full flat mirror (without the side-wall reflection). These reflections are more for light striking a topmost surface of the quadric reflector and in embodiments where the aperture 118 has a small diameter. These stray reflections are minimized by recessing the full flat mirror into a cavity and absorbing off-center reflections from the full flat mirror at cavity sidewalls (as shown in FIG. 1H).

Turning back to FIG. 1C, in one embodiment, a top portion of the panoramic optical device 110 can be removable/replicable. This top portion includes the cylindrical overhang 111 and the full flat mirror 114 and does not include the quadric reflector. The top portion shown in FIG. 1C may screw onto the base or otherwise security connect. The arrangement of FIG. 1C is beneficial as sensitive components, such as the optics stored in the base and the quadric reflector 116 are protected. Should the outer surface (the transparent sides) become damaged or scratched, the top portion can be replaced without modifying the bottom portion, which extends the expected life of the panoramic optical device. In a further embodiment, the full flat mirror 114 may be extractable from the topmost portion and re-used, which further minimizes costs should the topmost portion of the optical device 110 need be replaced.

FIG. 1D shows an interior view of the topmost portion, specifically showing the overhang and the full flat mirror recessed in the cavity. The overhang surface and/or the interior cavity walls can be light-absorptive to absorb stray reflections.

FIG. 1E shows an alternative embodiment for an overhang enclosure shape for the top portion of the panoramic optical device 110. The shape need not be conical, but can be any shape such that it properly positions the full flat mirror 114, it doesn't block light paths, and it absorbs stray light entering at angles not of interest.

FIG. 1F shows a planar view of the full flat mirror. A side view of the full flat mirror is illustrated by FIG. 1G. In one embodiment, the full flat mirror can be precisely constructed so that it reflects light without any refractions. For example, the full flat mirror can be a highly polished reflective surface, such as stainless steel. No glass backed by a metal is used in embodiments, as a presence of the glass can produce refractions. Thus, the full flat mirror is a highly reflective, non-refractive reflective surface. The manufacture of the full flat mirror must be precise and accurate, as must the mirror's polish. This ensures no/minimal optical distortions result from its use.

The use of the full flat mirror effectively "folds" the quadric shape of the quadric reflector 220 onto a flat surface. That is, the fold onto the flat surface is one hundred and eighty degrees above the quadric reflector. This arrangements permits sensitive components to be encased within the volumetric region of the quadric reflector. The overall footprint of the panoramic optical device 110 remains small. Further, no inverted hyperboloid/hemisphere needs be positioned above the camera image sensor (which is common for other implementations), since the effective curvature is folded into the full flat mirror. In addition to absorbing stray reflections, the cavity within which the mirror is recessed helps to protect the full flat mirror, ensuring the polish is retailed and that the mirror's surface is not scratched.

Figure 2A:
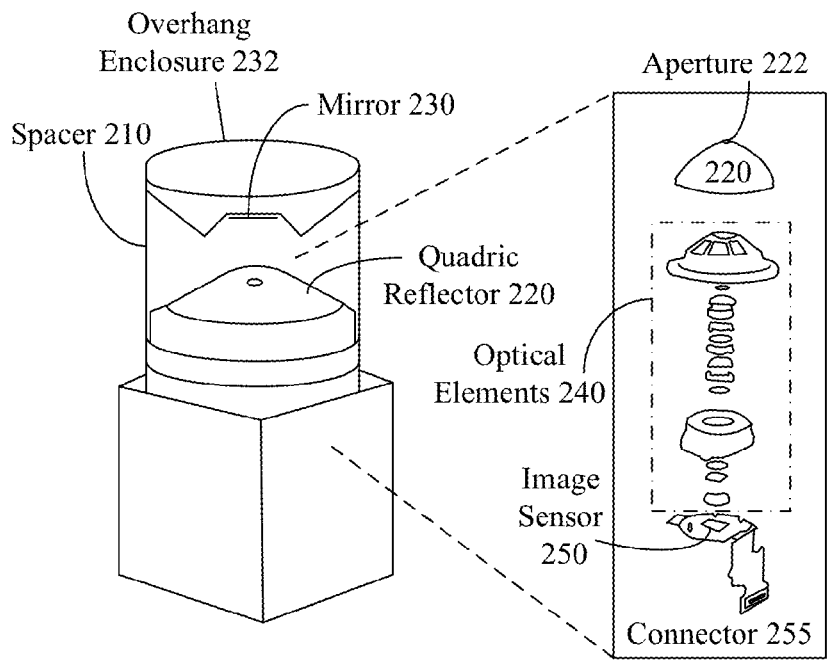
FIG. 2A illustrates a panoramic optical device with an enclosure overhang in accordance with embodiments of the disclosure.

Referring to FIG. 2A, a panoramic optical device is shown and described in accordance with embodiments of the disclosure. The device includes an overhang enclosure 232, a quadric reflector 220, a reflecting mirror 230, and a spacer 210, though which light passes. The quadric reflector 220 includes a hole or aperture 222 in its apex. The cavity of the mirror 230 is shown as being angled, which is one contemplated embodiment. The angle used for the cavity (if any) must still allow stray reflections to strike the sidewall of the interior of the cavity to be absorbed.

In one embodiment, a set of components included in a base of the panoramic optical device includes optical elements 240 and an image sensor 250 electrically coupled to connector 255. The optical elements 240 guide light reflected off mirror 220 to strike sensor 250. The optical elements may also filter undesired optical wavelengths, correct for color aberrations that would otherwise cause different colors to focus at different planes and positions, and/or ensure despite distortions from the quadric reflector 220 that the optical image substantially lays on a flat focal plane.

In another embodiment, the set of components can include a light emitter, such as a pico-projector chipset or a set of light emitting diodes (LEDs) of varying colors, which permits the panoramic optical device to become a light/image projector instead of an image capture device.

The overhang enclosure 232 can be utilized to restrict and/or eliminate secondary reflections from environmental light entering the aperture 222. In one instance, enclosure 232 material can include polymethyl methacrylate (PMMA, or acrylic), thermoplastic polymers, and the like.

The quadric reflector 220 is a reflective conical surface, which may be a parabolic surface, a hyperbolic surface, a hemispherical surface, or an elliptic surface. More specifically, the quadric reflector 220 as used herein is a non-degenerate real quadratic surface that tapers from a wide base towards an apex, where the aperture 222 is positioned.

The image sensor 250 is a component that converts an optical image into an electronic signal. Any of a variety of image sensors technologies can be for the image sensor 250 including, but not limited to, semiconductor charge-coupled devices (CCD), active pixel sensors in complementary metal-oxide-semiconductor (CMOS), and N-type metal-oxide-semiconductor (NMOS, Live MOS) technologies.

In embodiments, where the image sensor 250 is replaced with a pico-projector, also referred to as a pocket projector, a mobile projector, a handheld projector or a mini beamer) any of a number of technologies can be utilized including, but not limited to digital light processing (DLP), MICROVISION's beam-steering, and LCoS (Liquid crystal on silicon) based technologies.

In one embodiment, positive elements of the optical elements 240 can be made from polymethyl methacrylate (PMMA, or acrylic), other transparent thermoplastic, glass, or other suitable substances. Other ones of the optical elements 240, which provide structural support while not directly focusing or directing light, can be made of polycarbonate, other thermoplastic polymers, or other suitable substances.

Figure 2B:
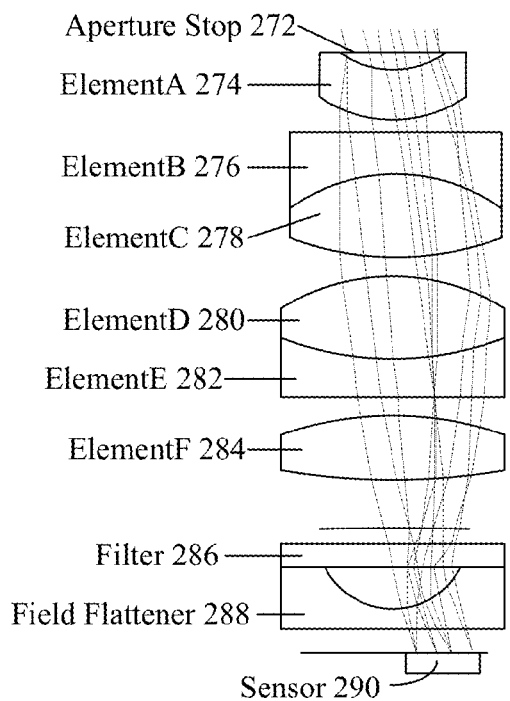
FIG. 2B illustrates a set of optical elements for a panoramic optical device in accordance with embodiments of the disclosure.

FIG. 2B shows optic elements between the aperture stop 272 and the image sensor 290 in accordance with embodiments of the disclosure. In FIG. 2B, the aperture stop 272 limits the bundle of light that passes through the optical elements. ElementA 274 captures light passing through the aperture stop and reduces its divergence. In one embodiment, cemented doublets can be formed from ElementB 276 and ElementC 278. ElementD 280 and ElementE 282 produce a converging beam and correct color aberrations that would otherwise cause different colors to be focused at different planes and positions. ElementF 284 increases convergence of the light. A flat filter 286 can be used to block infrared, violet, and ultraviolet radiation. The filtered wavelengths can blur the image and produce color rendering errors in some embodiments. The field flattener 288 corrects extreme field curvature in the virtual image within the quadric reflector 220. The field flattener 288 results in the image sent to the sensor 290 lying flat on a focal plane. Not all elements 272-288 are needed in all embodiments and further elements (not shown) may be included in different contemplated embodiment of the disclosure.

Figure 3:
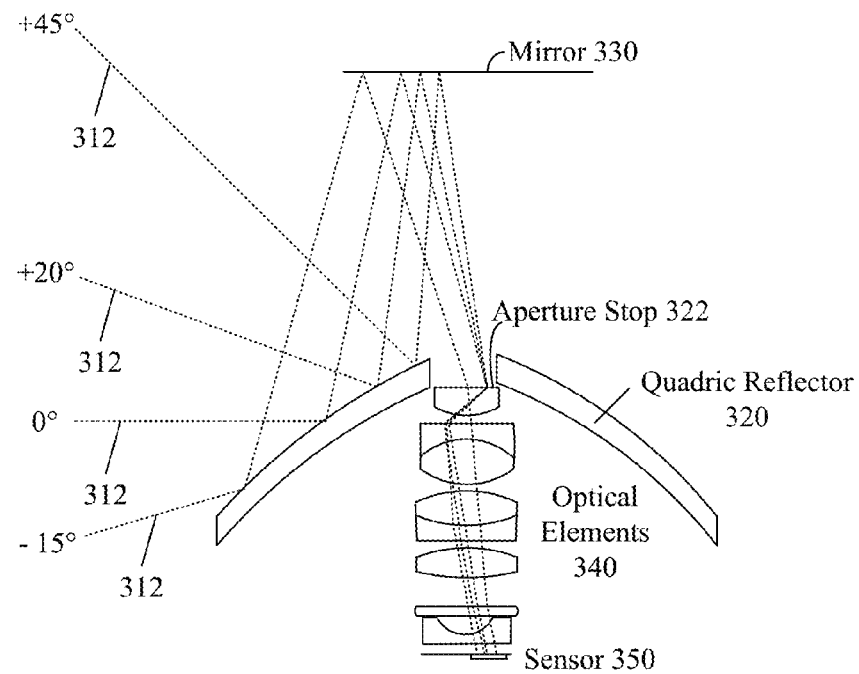
FIG. 3 illustrates a ray trace diagram of light reflecting off a quadric reflector at different angles in accordance with embodiments of the disclosure.

FIG. 3 shows a ray trace diagram of light 312 reflecting off the quadric reflector 320 at different angles in accordance with embodiments of the disclosure. The reflected light strikes mirror 330 and is directed towards the aperture stop 322. From here, the light is guided by optical elements 340 so that it strikes sensor 350.

The angles shown are from the horizon. It should be appreciated that most one-shot cameras are unable to handle angles below the horizon, such as the negative fifteen degree angle. The positioning of the parabolic reflector 320 relative to the mirror 330 and the aperture stop 322 results in a substantially greater vertical field of view at high fidelity than is possible using conventional technologies.

The reflections off the mirror 330 result in different angles of light striking the aperture stop 322. The optic elements 340 focus and filter this light to strike the sensor 350. From a design perspective, the sensitive of the sensor 350 is paired to the optic elements 340, to maximum the fidelity of images (able to be read by the sensor 350), while minimizing costs of the optical elements 340, which have a significant expense due to necessary precision and tolerances. In this manner, a 4K image sensor (350) is able to be utilized with the panoramic optical device to produce high definition video (HDV) at 1080 lines or greater.

Unlike conventional one-shot devices, optical elements 340 and sensor 350 are protected within the curvature of the quadric reflector 320. This results in a compact form factor, where sensitive components are easier to protect than alternative technologies.

Figure 4:
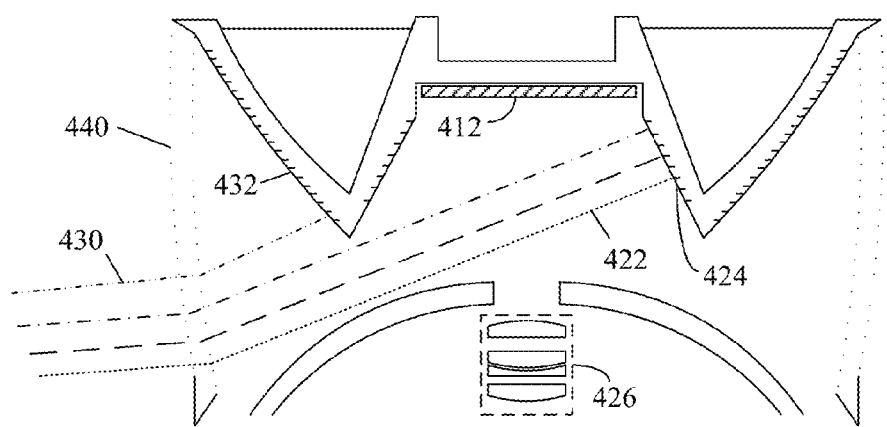
FIG. 4 shows a ray trace diagram of environmental light at different angles blocked by overhand enclosure in accordance with embodiments of the disclosure.

FIG. 4 shows a ray trace diagram of environmental light 430, 422 at different angles blocked by overhand enclosure 432, 424 in accordance with embodiments of the disclosure.

Environmental light 430 can pass through transparent spacer 440 and can be absorbed by overhang enclosure portion 432. That is, environmental light 430 can be refracted by spacer 440 resulting in the light path travelling approximately tangential to the quadric reflector and striking enclosure portion 432. In one instance, overhang enclosure portion 432 can include one or more grooves which can absorb environmental light 430. In the instance, the groove characteristics can be optimized for maximum light absorption based on light spectrum, light angle of incidence, and the like.

Environmental light 422 can pass through transparent spacer 440 and can be absorbed by overhang enclosure portion 422. That is, light 422 can be refracted by spacer 440 resulting in the light path travelling approximately tangential to the quadric reflector and striking enclosure portion 424. In one instance, overhang enclosure portion 422 can include one or more grooves which can absorb environmental light 422. In the instance, the groove characteristics can be optimized for maximum light absorption based on light spectrum, light angle of incidence, and the like.

Figure 5:
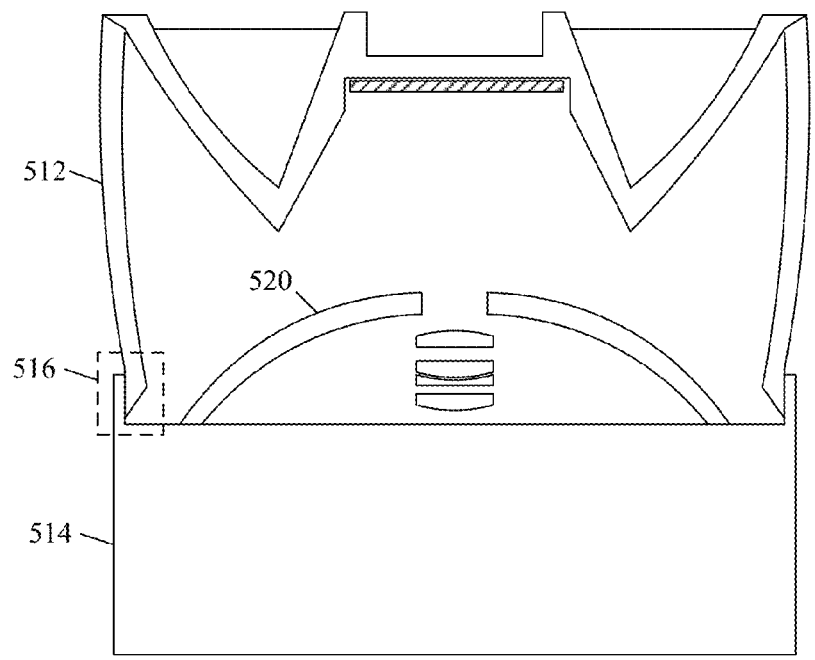
FIG. 5 shows a set of embodiments for attaching an overhang enclosure to a panoramic optical device and an exemplary configuration for an overhang enclosure in accordance with embodiments of the disclosure.
Figure 5:
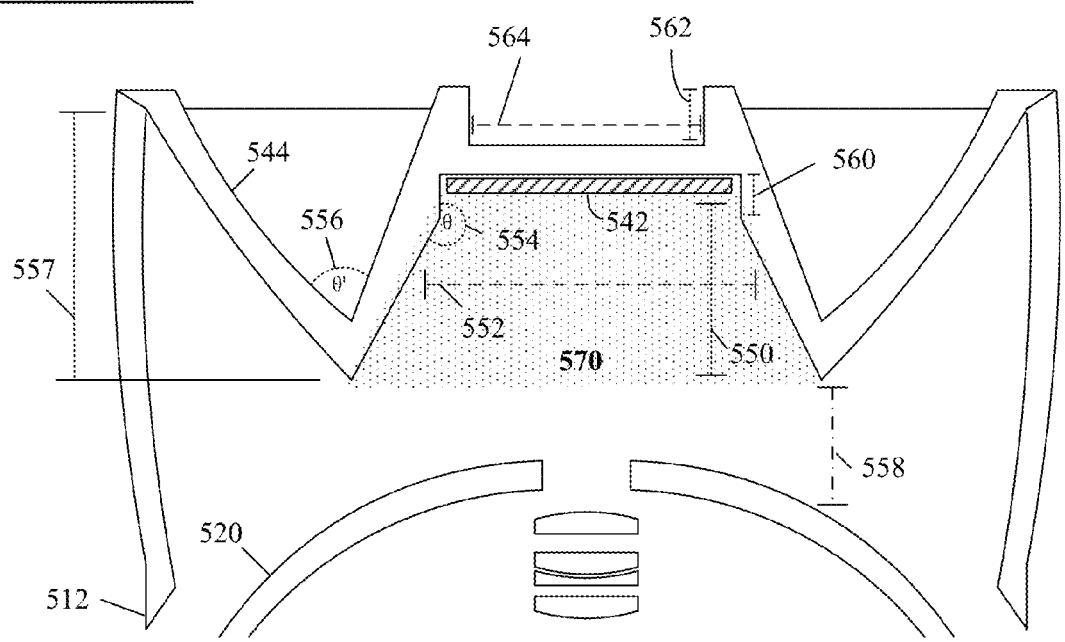

FIG. 5 shows a set of embodiments for attaching an overhang enclosure to a panoramic optical device and an exemplary configuration for an overhang enclosure in accordance with embodiments of the disclosure.

In embodiment 510, an overhang enclosure 512 can be friction fitted to a base of a panoramic optical device. In the embodiment, a bottom portion of a transparent spacer can be securely fitted against a protruding wall of base 514. For example, enclosure 512 can be mated against a lip (e.g., area 516) of base 514. It should be appreciated that enclosure 512 can be fitted to base 514 using one or more traditional and/or proprietary attachment mechanisms. Attachment mechanisms can include, but is not limited to, snapping/locking mechanism, a screw based attachment mechanism, and the like.

In embodiment 540, the overhang enclosure 512 can include a conical cross section (e.g., cavity 570) corresponding to dimensions 522, 550 and an overhang 544 with dimension 557 at an angle 556. In one instance, mirror 542 can be recessed within the cavity 570 based on optimum depth 560. In one configuration of the instance, depth 560 can include a cylindrical portion which can recess the mirror 542 for optimum light reflection into aperture of reflector 520. The cavity 570 can be defined by internal angle 554 which can be utilized to control environmental light absorption. That is, angle 554 can be adjusted to ensure optimum light absorption without affecting light reflected from mirror 542 or reflector 520.

In one instance, overhang 544 can be defined by angle 556 and length 557 which can approximately conform to an inverted conical pyramid. In one embodiment, overhang enclosure 512 can be positioned at a distance 558 from quadric reflector 520 to enable appropriate environmental light absorption.

Overhang enclosure 544 can include a recessed cylindrical area which can be defined by dimension 562, 564. For example, enclosure 544 can include a recessed portion at the top exterior portion of the enclosure.

Drawings presented herein are for illustrative purposes only and should not be construed to limit the invention in any regard. It should be appreciated that overhang enclosure 512 can include additional segments which can be utilized to absorb environmental light to eliminate secondary reflection.

Figure 6:
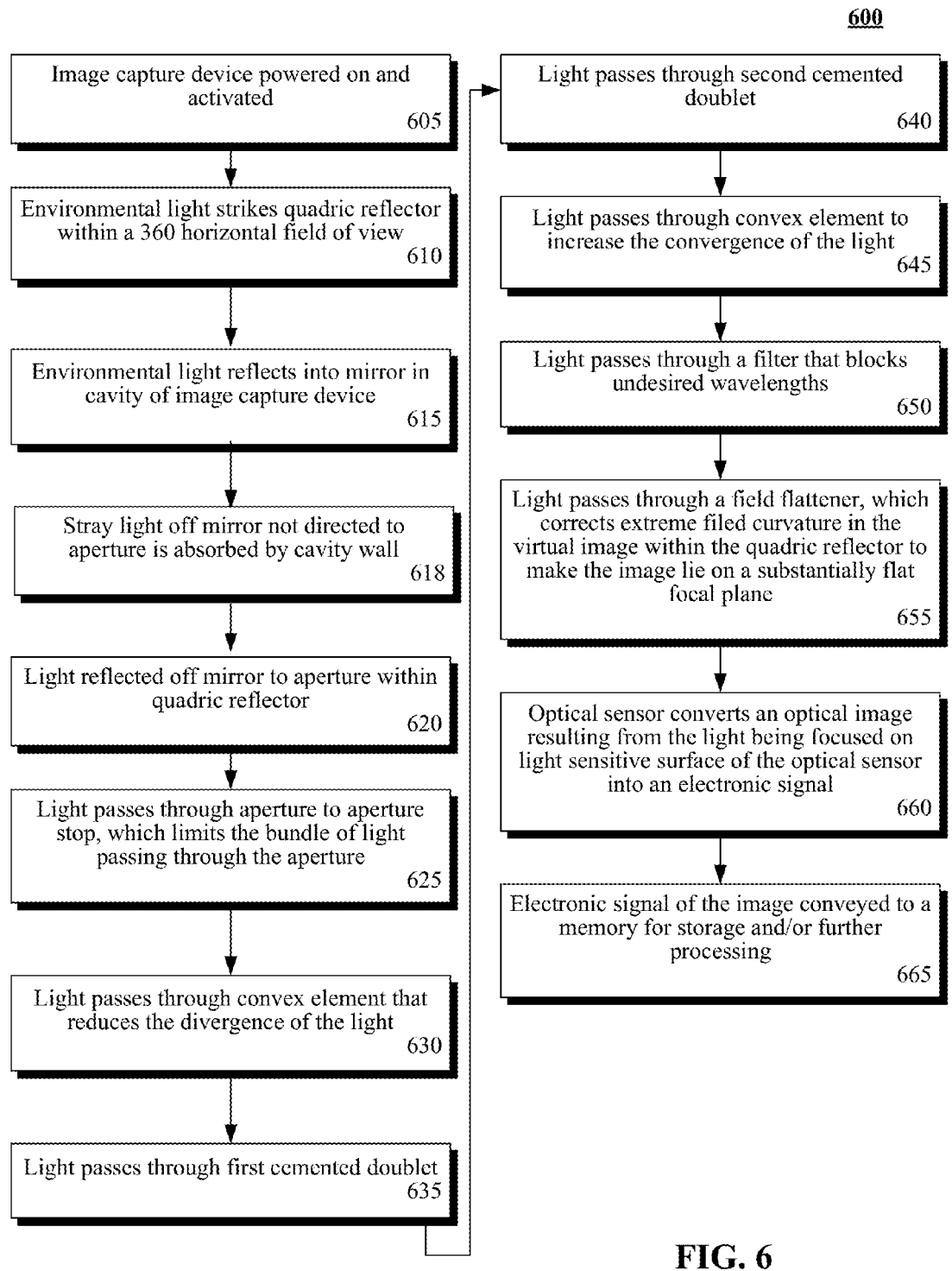
FIG. 6 shows a flow chart for a one shot panoramic camera in accordance with embodiments of the disclosure.

FIG. 6 shows a flow chart for a one shot panoramic camera in accordance with embodiments of the disclosure. The process can begin in step 605, where an image capture device is powered on and activated. In step 610, environmental light strikes a quadric reflector within a 360 horizontal field of view (FOV). Thus, a scene surrounding the optical device is concurrently captured within this 360. The vertical field of view depends on construction, but in one embodiment includes angles between negative fifteen degrees and positive 45 degrees. In step 615, environmental light reflects from the quadric reflector to a mirror in a cavity of the one-shot panoramic camera. The mirror can be positioned directly above the aperture of the quadric reflector in one embodiment. The mirror may be substantially flat (within +/- one percent of being flat). The mirror may be reflective but not refractive. In step 618, stray light reflected by the mirror (not directed to the aperture) is absorbed by cavity walls, of a cavity within which the mirror is recessed. In step 620, light reflected off the mirror can enter an aperture of the quadric reflector.

A set of optical elements can reside on an opposite side of the aperture in embodiments of the disclosure. The described optical elements need not be present in every contemplated configuration of the disclosure and additional elements may be included in contemplated configurations of the disclosure. In step 625, light can pass through the aperture to an aperture stop, which limits the bundles of light passing through. In step 630, light can pass through a convex element that reduces the divergence of the light. In step 635, light can pass through a first cemented doublet to pass through a second cemented doublet in step 640. These doublets can be paired to reduce divergence of the light then to increase convergence (see elements 276, 278, 280, and 282 of FIG. 2, for example). Other embodiments are contemplated, where a single doublet is utilized, or where multiple paired doublets (more than two) are utilized. In step 645, light passes through a filter that blocks undesired wavelengths. For example, infrared, violet, and/or ultraviolet wavelengths may be undesired in that they contribute to blurring the image and producing color rendering errors in some embodiments of the disclosure.

In step 655, light passes through a field flattener, which corrects for extreme curvature in the virtual image due to the conic shape of the quadric reflector. This makes the image lie on a substantially flat (within +/−10 percent of being flat) focal plane. In step 660, an optical sensor converts an optical image resulting from the light being focused on a light sensitive surface of the optical sensor into an electronic signal. In step 665, the electronic signal can be conveyed to a memory for storage and/or further processing. For example, a raw image can be saved to a non-transitory memory in one embodiment, which may be projected from a panoramic projector. The raw image may be later processed by a computing device. In another implementation, the electronic signal may be digitally processing, using a variety of digital signal processing techniques and saved post-processing to a non-transitory memory and/or be visually displayed on a screen as a panoramic scene.

Accordingly, embodiments of the disclosure herein provide the benefit of eliminating stray reflections not angled to reflect off a mirror through an aperture. These stray reflections would otherwise add noise to the image being captured. The stray reflection elimination is by absorption from interior side walls of a cavity within which the mirror is recessed. The problems with reflections of the flat mirror are not known to exist in the prior art in context, as the solution and problem are part of the unique optical relationships resulting from the disclosed approach. The exact depth that the mirror is inset into the cavity depends on the optic properties of the panoramic device when viewed as a system (see FIGS. 1L-1M). In one embodiment, when mathematically folding the curve of the reflector onto the flat mirror, the flat mirror can be recessed until the folded curve is impeded or blocked by the recess. Further recessing will result in blockage of desired reflections (primary ones).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

What is claimed is:

1. A device comprising:
   a reflector having a conical shape, which tapers from a wide base to an apex, said apex comprising an aperture;
   a mirror located in a cavity of an overhang enclosure of the device, wherein the mirror is positioned in a plane approximately parallel to a circular cross section of the reflector, wherein a center of the mirror is substantially centered above the aperture, wherein walls of the cavity within which the mirror is located comprise a light absorbing material which absorbs stray light, wherein stray light is light reflected from the reflector and mirror not directed for conveyance through the aperture upon being initially reflected by the mirror, wherein absorption of the stray light by the walls of the cavity minimizes light being double reflected off the mirror through the aperture, and wherein in absence of reflected light being absorbed by the walls of the cavity at least one percent of the stray light would be double reflected through the aperture; and
   a set of one or more optical elements positioned at least partially within a volumetric region of the reflector, said one or more optical elements focusing light passing through the aperture.

2. The device of claim 1, wherein the mirror is a non-refractive mirror lacking a glass surface.

3. The device of claim 1, wherein the mirror has a circular, planar, polished metal surface.

4. The device of claim 1, wherein the mirror optically folds a shape of the reflector one hundred and eighty degrees above the aperture.

5. The device of claim 1, wherein the walls of the cavity absorb at least eighty percent of the stray light.

6. A device comprising:
   a reflector having a conical shape, which tapers from a wide base to an apex, said apex comprising an aperture; and
   a mirror location in a cavity of an overhang enclosure of the device, wherein the mirror is positioned in a plane approximately parallel to a circular cross section of the reflector, wherein a center of the mirror is substantially centered above the aperture, wherein walls of the cavity within which the mirror is located comprise a light absorbing material which absorbs stray light, wherein stray light is light reflected from the reflector and mirror not directed for conveyance through the aperture upon being initially reflected by the mirror, wherein absorption of the stray light by the walls of the cavity minimizes light being double reflected off the mirror through the aperture, and wherein in absence of reflected light being absorbed by the walls of the cavity at least one percent of the stray light would be double reflected through the aperture.

7. The device of claim 6, wherein the device with the reflector has a horizontal field of view of three hundred and sixty degrees and has a vertical field of view that includes negative fifteen degrees to positive forty five degrees.

8. The device of claim 6, further comprising:
a transparent spacer surrounding the reflector and the mirror, wherein the transparent spacer supports the mirror in a position substantially parallel to the cross section at a length from the aperture and the reflector to ensure reflections off the reflector to the mirror and subsequently off the mirror are directed through the aperture.

9. The device of claim 6, further comprising:
an image sensor for converting an optical image into an electronic signal, said optical image resulting from light reflecting off the reflector, reflecting off the mirror, passing through the aperture, to be received by the image sensor.

10. The device of claim 6, wherein the device is a one-shot panoramic camera with a three hundred and sixty degree horizontal field of view, with a vertical field of view including an arc between negative fifteen degrees and positive forty five degrees, wherein the image sensor is a 4K or higher sensor, wherein the one-shot panoramic camera captures full motion video at least a 1080-line high definition video (HDV) standard.

11. The device of claim 6, wherein the mirror is a non-refractive mirror lacking a glass surface, wherein the mirror has a circular, planar, polished metal surface.

12. The device of claim 6, wherein the mirror optically folds a shape of the reflector one hundred and eighty degrees above the aperture.

13. The device of claim 6, wherein the walls of the cavity absorb at least eighty percent of the stray light.

14. A panoramic camera optical component comprising:
a mirror located in a cavity of an overhang of a panoramic optical camera device, wherein the mirror is positioned in a plane approximately parallel to a circular cross section of a reflector of the panoramic optical camera device, wherein a center of the mirror is substantially centered above an aperture of the reflector, wherein walls of the cavity within which the mirror is location comprise a light absorbing material which absorbs stray light, wherein stray light is light reflected from the reflector and mirror not directed for conveyance through the aperture upon being initially reflected by the mirror, wherein absorption of the stray light by the walls of the cavity minimizes light being double reflected off the mirror through the aperture, and wherein in absence of reflected light being absorbed by the walls of the cavity at least one percent of the stray light would be double reflected through the aperture; and
a transparent outer casing with a circular cross section, wherein a topmost portion of the overhang enclosure is secured to a topmost portion of the transparent outer casing, wherein a bottommost portion of the transparent outer casing is securable to a structure that supports the reflector, wherein an interior volume of the transparent outer casing when secured to the structure includes the reflector, and the mirror.

15. The panoramic camera optical component of claim 14, wherein the mirror optically folds a shape of the reflector one hundred and eighty degrees above the aperture.

16. The panoramic camera optical component of claim 14, wherein the walls of the cavity absorb at least eighty percent of the stray light.

17. The panoramic camera optical component of claim 14, wherein the mirror is a non-refractive mirror lacking a glass surface, and wherein the mirror has a circular, planar, polished metal surface.

18. The panoramic camera optical component of claim 14, further comprising:
the overhang enclosure of the overhang having a substantially conical shape, which tapers from a wide base at a topmost portion to a narrower center, wherein circular cross sections of the overhang's substantially conical shape from the topmost portion to the narrower center portion have an approximately diminishing circular cross section, wherein an outer tapering surface of the overhang enclosure between at least the topmost portion and the narrower center portion is formed from or coated with a light absorbing material.

* * * * *